(12) United States Patent
Jenkins et al.

(10) Patent No.: US 9,928,203 B1
(45) Date of Patent: Mar. 27, 2018

(54) OBJECT STORAGE MONITORING

(71) Applicant: Western Digital Technologies, Inc., Irvine, CA (US)

(72) Inventors: Dean Mitcham Jenkins, La Canada-Flintridge, CA (US); Dale Charles Main, La Canada-Flintridge, CA (US)

(73) Assignee: Western Digital, Irvine, CA (US)

( * ) Notice: Subject to any disclaimer, the term of this patent is extended or adjusted under 35 U.S.C. 154(b) by 201 days.

(21) Appl. No.: 14/800,570

(22) Filed: Jul. 15, 2015

(51) Int. Cl.
*G06F 13/42* (2006.01)
*G06F 3/06* (2006.01)

(52) U.S. Cl.
CPC .......... *G06F 13/4208* (2013.01); *G06F 3/061* (2013.01); *G06F 3/0644* (2013.01); *G06F 3/0685* (2013.01)

(58) Field of Classification Search
CPC ........ H04L 43/12; H04L 43/08; G06F 3/0653
See application file for complete search history.

(56) References Cited

U.S. PATENT DOCUMENTS

| | | | |
|---|---|---|---|
| 8,055,615 B2 | 11/2011 | Roberts et al. | |
| 2002/0144044 A1* | 10/2002 | Moon | G06F 3/0607 710/302 |
| 2002/0156887 A1* | 10/2002 | Hashimoto | H04L 12/2803 709/224 |
| 2005/0168934 A1* | 8/2005 | Wendel | G11B 33/128 361/679.36 |
| 2006/0190627 A1* | 8/2006 | Wu | H04L 12/2801 709/249 |
| 2008/0005410 A1* | 1/2008 | Mies | G06F 3/0614 710/62 |
| 2010/0131693 A1* | 5/2010 | Chien | G06F 11/3485 711/4 |
| 2014/0025770 A1 | 1/2014 | Warfield et al. | |
| 2014/0195859 A1* | 7/2014 | Dickenson | G06F 11/183 714/43 |
| 2014/0310370 A1 | 10/2014 | Hendel et al. | |
| 2016/0349993 A1* | 12/2016 | Udupi | G06F 3/061 |
| 2016/0378630 A1* | 12/2016 | Narayanan | G06F 11/324 710/18 |

* cited by examiner

*Primary Examiner* — Farley Abad
(74) *Attorney, Agent, or Firm* — Chang & Hale LLP (57) ABSTRACT

Systems and methods are disclosed for monitoring object storage in a data storage system. A storage device tray assembly includes a plurality of data storage bays configured to receive data storage devices, a plurality of data storage devices mounted in the plurality of data storage bays, and an interface expander device communicatively coupled to each of the data storage devices over a first communication interface. The interface expander device may include non-volatile memory storing object storage monitor code and operating system code, and one or more processors configured to perform port or switch initialization for communications to the plurality of data storage devices and execute the operating system code and the object storage monitor code to provide object storage monitor functionality for the plurality of data storage devices.

18 Claims, 4 Drawing Sheets

OBJECT STORAGE MONITORING

BACKGROUND

In data storage systems, such as in data center environments, object-based storage can provide certain benefits. Object-based storage systems may include one or more object storage daemon (OSD) nodes and/or object storage monitor nodes for facilitating successful operation of the system.

BRIEF DESCRIPTION OF THE DRAWINGS

Various embodiments are depicted in the accompanying drawings for illustrative purposes, and should in no way be interpreted as limiting the scope of this disclosure. In addition, various features of different disclosed embodiments can be combined to form additional embodiments, which are part of this disclosure.

DETAILED DESCRIPTION

While certain embodiments are described, these embodiments are presented by way of example only, and are not intended to limit the scope of protection. Indeed, the novel methods and systems described herein may be embodied in a variety of other forms. Furthermore, various omissions, substitutions and changes in the form of the methods and systems described herein may be made without departing from the scope of protection.

The headings provided herein are for convenience only and do not necessarily affect the scope or meaning of the claims. Disclosed herein are example configurations and embodiments relating to object storage monitoring systems and methods.

Overview

In various computing systems, such as data centers, implementation of distributed object storage may be desirable. Various data storage management solutions may be deployed in such environments. For example, Ceph, or other object storage software platform, may be utilized to manage distributed data storage among a group, or cluster, of data storage devices and/or systems. Furthermore, Ethernet (or other communication protocol) based object storage may advantageously provide desirable performance in such a distributed storage system.

In distributed storage systems, groups of data storage devices (e.g., for object storage) may be consolidated in discreet physical trays, or chassis, which may provide certain operational benefits. For example, in certain embodiments, chassis compliant with the Open Compute Project, such as the Knox drive tray, may be used. Such trays, or chassis, may include interface expander device(s) in, for example, a front end of the tray/chassis for the purpose of providing communication pathways to individual storage devices associated therewith. Interface expander devices may be any suitable or desirable type of device, depending on the data communication protocol(s) utilized. For example, storage device trays may include SAS expander devices, SAS expander boards (SEBs), network expander boards (NEBs) or expander devices (e.g., Ethernet switch cards), or other types of interface expanders.

Certain embodiments disclosed herein provide for distributed data storage systems utilizing Ethernet switches as tray interface expander devices. Such Ethernet switches may incorporate one or more processors within the device to control, and/or provide status back to, the system, among possibly other functionality. In certain embodiments, a storage device tray includes an Ethernet switch device having two processors integrated/embedded therein. For example, one embedded processor may be an ARM R5 microcontroller, which may be utilized for hardware configuration and/or other managerial tasks. The second processor may be an ARM A9 processor, for example. The A9 processor, in combination with external DRAM associated therewith, may be utilized to run operating system code (e.g., Linux) and/or object storage monitoring software (e.g., Ceph monitor).

Utilization of processor(s) embedded in a network expander board or network switch for object storage monitoring functionality may provide various benefits, such as relatively low cost. Such a monitor module may be tasked with monitoring only a limited number of storage devices, namely the number of storage devices housed or associated with the particular tray in which the network expander/switch is disposed. For example, a storage device tray may house 15, 30, or other number of storage devices. With a limited number of storage devices to be monitored, an opportunity exists to leverage those built-in or stock processor(s) in network expander boards or switches (which may be of limited processing power) for this object storage monitoring function.

Whereas in certain object storage monitoring systems (e.g., Ceph), a separate server may be required to run the object storage daemons (OSDs) when storage devices are connected, for example, through SAS interfaces, some embodiments disclosed herein include systems and methods in which such OSDs are run directly on Ethernet-based data storage devices (or data storage devices that are network-connected through other protocols) that have their own processor capacity to run such OSDs, while the object storage monitoring software is run on the Ethernet switch or expander board, thereby obviating the need for a separate server employed for such purposes. Using a processor embedded in a switch, which may be part of a network expander board of the storage device tray or a top-or-rack switch component, may provide reduced cost, complexity, and/or other benefits.

The term "OSD" is used herein according to its broad and ordinary meaning. One having ordinary skill in the art will appreciate that "OSD" may be used herein to refer to an object storage daemon, which may comprise software and/or firmware designed/configured to direct the implementation of object storage functionality. Furthermore, any type and/or quantity of software and/or hardware configured to provide object storage monitoring and management functionality may be referred to herein as an "object monitoring node," or the like.

Object Storage Monitoring

Figure 1:
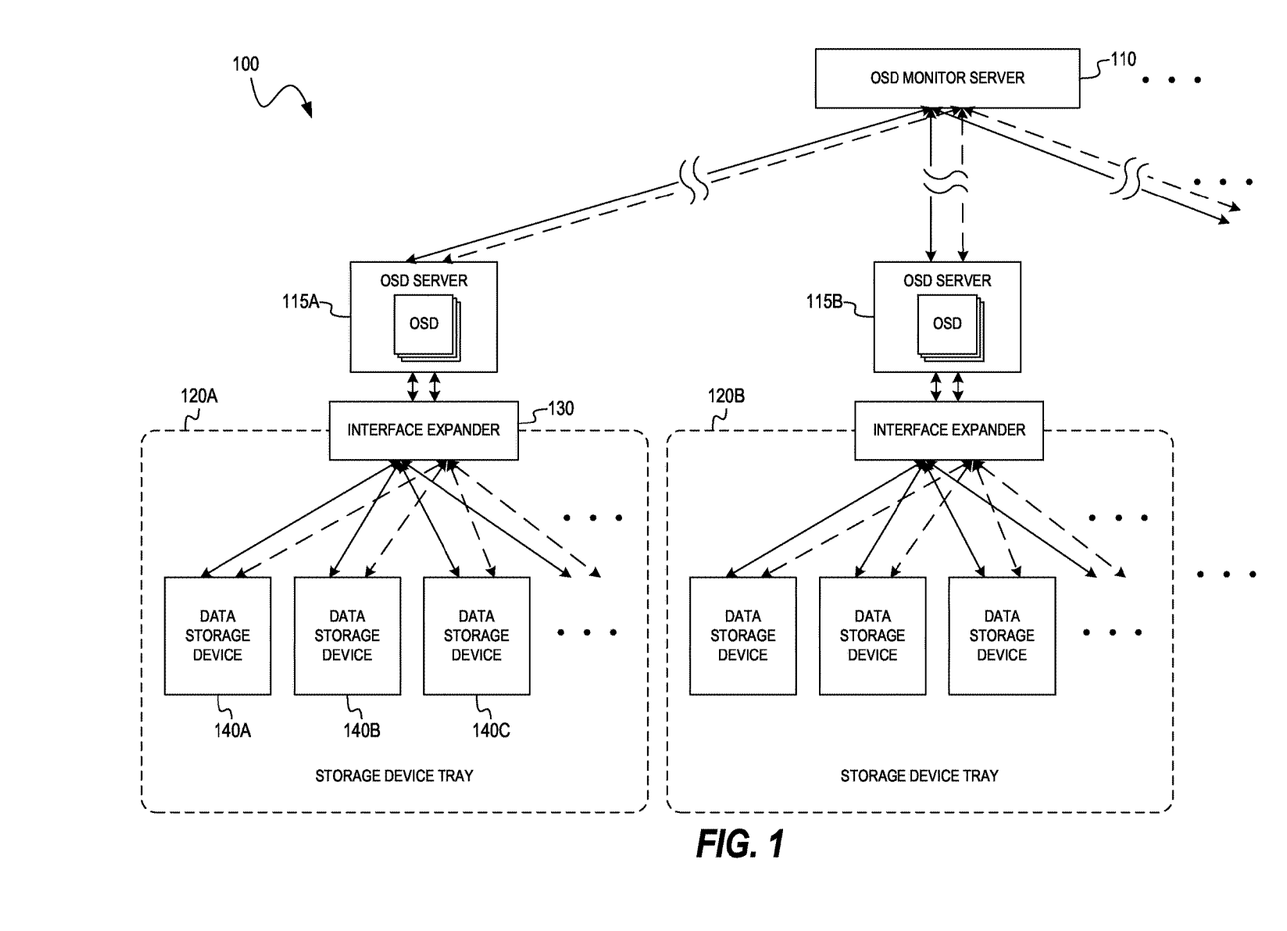
FIG. 1 is a block diagram illustrating a system for monitoring data storage devices according to one or more embodiments disclosed herein.

FIG. 1 is a block diagram illustrating a system 100 for monitoring data storage devices according to one or more embodiments disclosed herein. The system 100 includes a server running monitor software or module 110, which may provide storage device monitoring functionality for at least a portion of the system 100. The server 110 may be, for example, a Xenon server. In the system 100, the server 110 may be configured to run object storage monitoring for the data storage devices of the system 100.

The system 100 further includes one or more storage device chassis, or trays, 120A, 120B communicatively coupled to the object storage monitor server 110. The trays 120A, 120B of the system 100 may be interconnected. In certain embodiments, the storage device trays 120A, 120B are mounted in a common rack housing, which may include certain physical and/or electrical connectivity features for facilitating operation of the trays and/or components thereof. The trays (e.g., tray 120A) may include an interface expander component (e.g., interface expander 130). In certain embodiments, the interface expander 130 is a network expander board, and may further be associated with certain switching hardware and/or software for facilitating communication with data storage devices of the tray 120A. In certain embodiments, the interface expander 130 is an Ethernet expander/switch. For example, the interface expander 130 and/or switching components of the tray 120A may serve to receive signals over a relatively high-bandwidth Ethernet interface (e.g., 10 GbE, 40 GbE) and produce multiple lower-bandwidth interfaces (e.g., GbE, 2.5 GbE) for communication with a plurality of data storage devices (140A, 140B, 140C, etc.) of the tray 120A. In certain embodiments, the interface expander 130 is a SAS expander, which takes a single SAS port and connects to 15 SAS ports, allowing for communication between a single host SAS port and, for example, 15 SAS drives. In certain embodiments, a single tray includes multiple interface expanders for the purpose of providing redundancy in the system to avoid a single point of communication failure. Using the interface expander 130, the object storage monitor server 110 may be able to access all of the functionality of the tray 120A over one (or two) ports.

The system 100 may further include one or more object storage daemon (OSD) servers 115A, 115B, which may individually implement the object storage functionality for a subset of data storage devices of the system. For example, the OSD server 115A may be designed to implement object storage functionality for at least a portion of the plurality of data storage devices associated with the tray 120A. It should be understood that although certain blocks, modules and/or features are illustrated in FIG. 1, additional software and/or hardware components may be included within the system within the scope of the present disclosure. For example, in certain embodiments, system 100 may include one or more additional system components or connectivity features (e.g., switch(es)) connected between the OSD server 115A and the object storage monitor server 110.

The storage device tray 120A has disposed therein one or more data storage devices (140A, 140B, 140C). For example the data storage devices may be physically mounted to a frame or housing of the tray 120A. The storage devices (e.g., data storage device 140) may be configured to be an object storage node. The OSD functionality may be run on the OSD server(s) (115A, 115B), such as in a system utilizing SAS devices. Alternatively, such as in a system utilizing Ethernet storage devices, the OSD functionality may be run on the individual storage devices. The storage device monitoring functionality for the system 100 may be implemented in the object storage monitor server 110, or other component of the system. The object storage monitor(s) of the system may be required to keep system mapping current within each of the object storage devices. Therefore, the system 100 may further include certain hardware for running the monitoring software.

Figure 2:
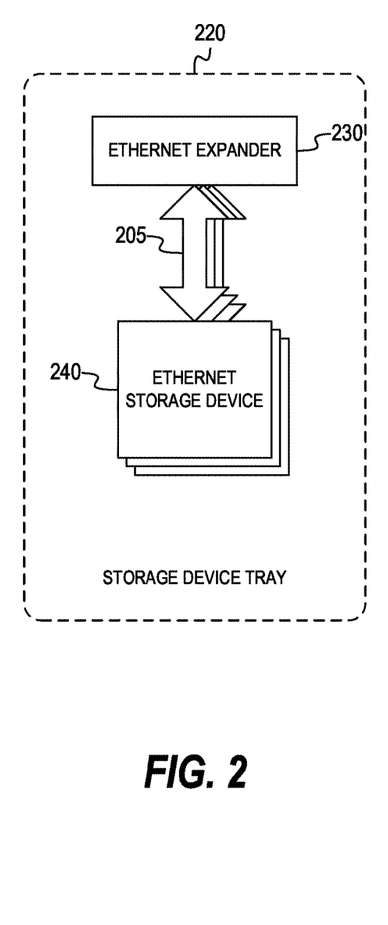
FIG. 2 is a block diagram of a storage device tray according to one or more embodiments disclosed herein.
Figure 3:
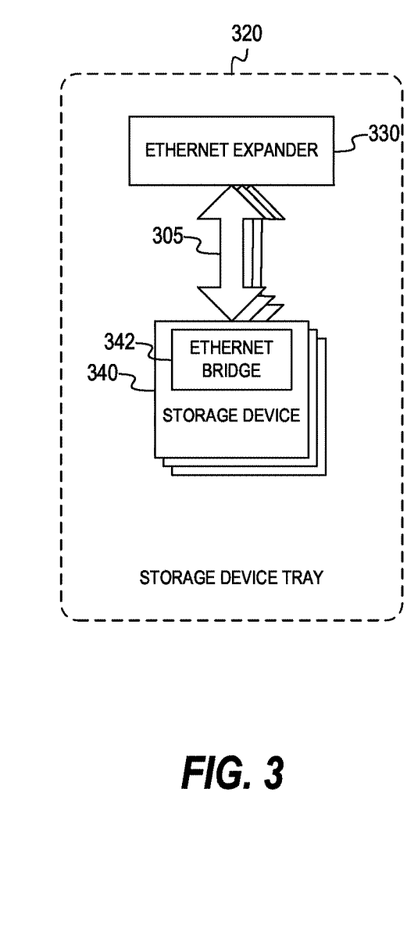
FIG. 3 is a block diagram of a storage device tray according to one or more embodiments disclosed herein.

FIGS. 2 and 3 show example configurations of storage device trays that may communicate using Ethernet protocol. FIG. 2 is a block diagram of a storage device tray 220 according to one or more embodiments disclosed herein. The tray 220 includes an Ethernet expander 230 configured to communicate with a plurality of Ethernet storage devices 240 over an Ethernet interface 205. The Ethernet storage devices 240 are included as an alternative to SAS/SATA drives, which may require an Ethernet bridge component in order to communicate over Ethernet protocol, as shown in FIG. 3.

FIG. 3 is a block diagram of a storage device tray 320 according to one or more embodiments disclosed herein. The tray 320 includes an Ethernet expander 330, similarly to the tray 220 of FIG. 2. The Ethernet expander 330 may be configured to communicate with one or more storage devices 340 over an Ethernet interface 305. The one or more storage devices may be SAS or SATA devices, and may further include an Ethernet bridge 342 component for translating communication signals between Ethernet protocol and the native protocol of the device, which may allow the storage devices 340 to be utilized in an object storage system such as Ceph. By using SAS/SATA devices in combination with an Ethernet bridge device, the system may be potentially less expensive than certain alternative systems utilizing Ethernet storage devices based on the absence of the need to modify the drive controller (SOC) to include an Ethernet interface, which may require at least partial reengineering of the front end of the device. As shown, the storage devices may be fitted with a bridge chip 342, which may provide an additional SOC providing certain functionality. In certain embodiments, an operating system (e.g., Linux) may be run on the Ethernet bridge 342 and the bridge may be utilized to provide OSD node functionality. The Ethernet bridge 342 may include both Ethernet and SAS or SATA ports, depending on the type of storage device used. In certain embodiments, the Ethernet bridge 342 may be disposed on a single board with the controller of the storage device 340. In view of the Ethernet bridge 342 positioned as shown in the transmission chain between the storage device 340 and the Ethernet expander 330, the storage device 340 may substantially appear to the Ethernet expander as an Ethernet storage drive.

The Ethernet expanders of FIGS. 2 and 3 may include one or more processors configured to run an operating system (e.g., Linux), such as, for example, a Cortex-A9 ARM processor, or other general purpose, relatively low-power, low-cost processor. The object storage monitor server 110 software for the system may run on the operating system on the Ethernet expander. The workload of the object storage monitor server 110 on the Ethernet expander may be limited to an extent in view of the limited number of object storage devices housed in the tray; as the number of storage devices monitored goes down, the workload on the monitor may also generally go down. In embodiments including trays (e.g., OCP Knox chassis) that hold 15 storage drives, the tray may include a maximum of 15 storage devices and one or two Ethernet switch cards (Ethernet expanders). Where each of the data storage devices is operated as an OSD (e.g., running Ceph), the monitor running on the processor (e.g., A9) of the Ethernet expander may be able to perform the object storage monitor operations for the limited number (e.g., 15) of data storage devices in the tray without substantial computational bandwidth issues.

Object Storage Monitoring Using Interface Expander

Certain embodiments disclosed herein provide for integration of object storage device cluster monitoring within an Ethernet switch, or expander board. Such systems may provide for reduction of components, power and/or cost with respect to certain other object storage solutions, and therefore may be advantageously employed in data center environments, among other possible environments.

Figure 4:
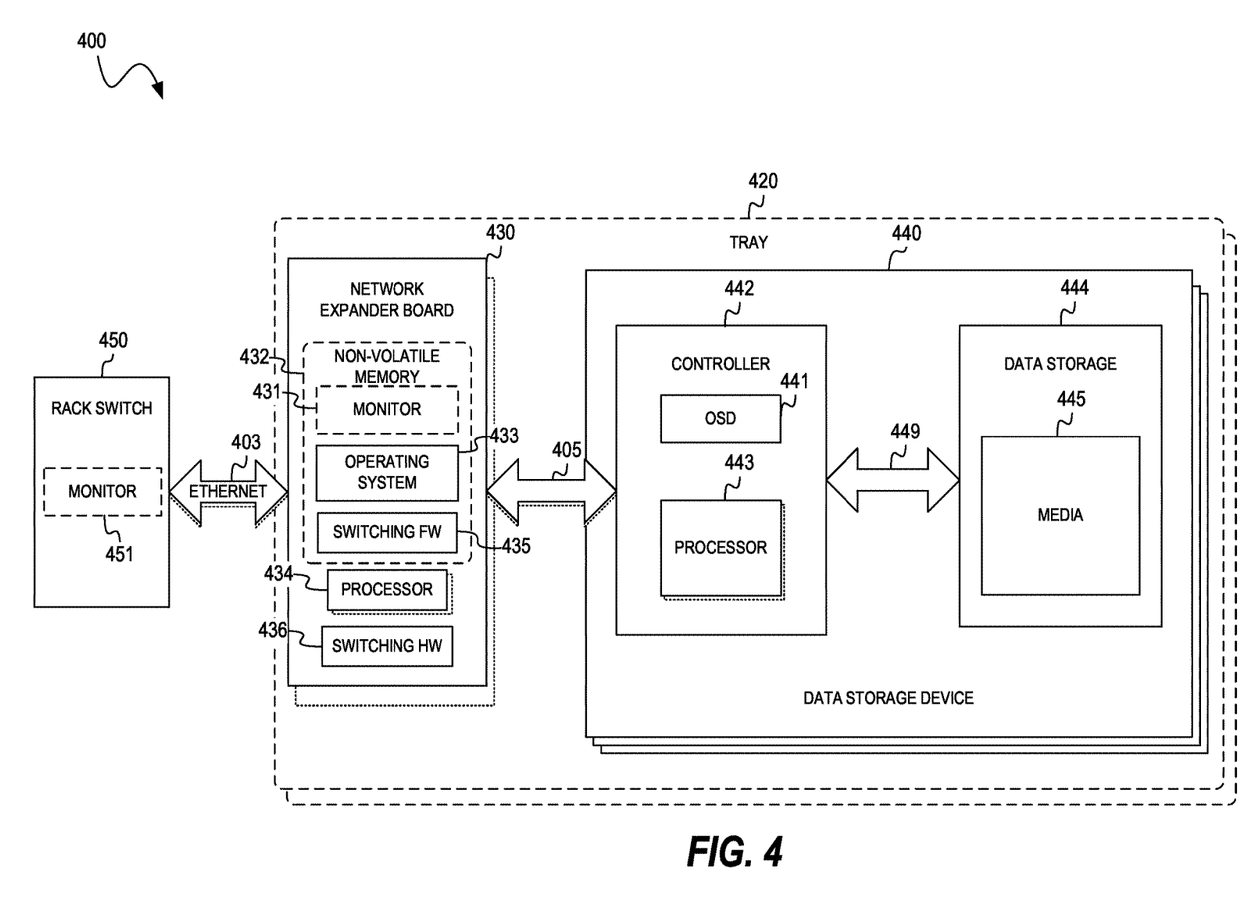
FIG. 4 is a block diagram illustrating a system for monitoring data storage devices according to one or more embodiments disclosed herein.

FIG. 4 is a block diagram illustrating a system 400 for monitoring data storage devices according to one or more embodiments disclosed herein. The system 400 includes a plurality of data storage devices 440, and at least one monitor node for monitoring the data storage devices. The plurality of storage devices 440 may be part of a data storage device cluster. As an alternative to certain systems utilizing a separate, stand-alone server as an object storage monitor node for the storage devices 440, which can introduce significant system cost and/or complexity, the system 400 may implement an object storage monitor (e.g., Ceph) node using a piece of hardware that is contained in one or more other components of the system 400, such as in a rack switch 450, or switch on a network expander board 430 of an individual tray 420. It should be understood that the network expander board 430 may be any type of interface expander or network/interface switch device or module, such as an Ethernet switch, or the like.

The object storage device tray 420 may be configured to have disposed therein, or mounted thereto, a plurality of data storage devices, such as the storage devices 440. In certain embodiments, the tray 420 is an OCP Knox drive tray, which may contain, for example, up to 15 storage devices. In certain embodiments, the tray 420 includes one or two interface expanders for expanding communication between a host, or rack switch 450, and the plurality of storage devices 440. In an embodiment, the tray 420 comprises slots for connecting up to 30 storage devices. In certain embodiments, the tray 420 is designed to hold up to 66 storage devices, or more.

The tray 420 may have one or more additional components not illustrated in FIG. 4 for convenience, which may include one or more of a power supply, power distribution board, backplane, storage drive sub-chassis, controller, fan trays, slides, rack posts, and/or other components.

The network expander board 430 may perform GbE switching functionality in certain embodiments. The network expander board 430 may be a component of the tray 420 or, alternatively, may be a separate component. In certain embodiments, the network expander board 430 includes one or more processors 434, such as an A9 processor, or the like, which may be configured to execute an operating system 433, which may be maintained in non-volatile memory 432 of the network expander board 430 and loaded for execution at run-time. In certain embodiments, processor(s) 434 of the network expander board 430 is/are designed to execute a Linux operating system (Linux kernel). The processor(s) 434 may be further utilized to implement object storage monitoring by executing monitor code 431 maintained in, for example, the non-volatile memory 432. In certain embodiments, the tray 420 includes two monitors, wherein the system 400 is configured to utilize an odd number of monitors spread over multiple trays (e.g., four monitors collectively available between two trays, with one of the four acting as backup for fail over, and the other three monitors collectively monitoring the storage devices between the two trays) to provide monitoring for the associated trays. For example, the tray 420 may include two network expander boards, each including a single monitor.

The network expander board 430 may be communicatively coupled to the plurality of data storage devices 440, which may be configured to run object storage software (e.g., Ceph), such that the devices 440 operate as object storage devices. In certain embodiments, the plurality of storage devices 440 comprises 15 storage devices.

The network expander board 430 may be communicatively coupled to one or more Ethernet ports of the tray 420. In certain embodiments, the tray 420 includes multiple network expander boards (e.g., Ethernet switches). By implementing object storage monitoring on the network expander board 430, the system 400 can take advantage of hardware that may already be provided with certain system components, such as Ethernet switches. The processor(s) 434 may comprise one or more A9, A53, or other embedded processor(s). In certain embodiments, the network expander board 430 (e.g., Ethernet switch) comprises a processor (e.g., A9) that is at least partially under-utilized, wherein such underutilization may be leveraged for the purpose of performing object storage monitoring functionality. Although the processor(s) 434 may be relatively minimalistic in regard to operational capacity, such capacity may be adequate to execute a basic operating system (e.g., Linux) and run object storage monitoring code (e.g. Ceph monitor) for a relatively small number of OSDs (e.g., 15).

The non-volatile memory 432 may be any suitable or desirable memory, and may include DDR attached memory, or the like. The code executed by the processor(s) 434, including the monitor code 431, may be executed primarily from the non-volatile memory 432. The processor(s) 434 may have a memory management unit, and may be a reduced instruction set computing (RISC) processor(s). Because the number of storage devices 440 in the tray 420 may be limited by the physical size and/or configuration of the tray, the RISC processor(s) may be adequate to execute monitoring of the data storage devices.

The monitor 431 may be used to perform a variety of object-based monitoring tasks and/or services, such as coordination or replication of data, retrieval of data, data tracking, data robustness, data mapping information management, crush map management, and/or other tasks for a plurality of OSDs. In certain embodiments, the system 400 may provide monitoring without the need for a separate monitor server outside of the illustrated components of FIG. 4. As mentioned elsewhere above, a Ceph monitor (Cephmon) daemon is an example of monitor 431.

With the monitor software and the operating system kernel loaded onto the processor(s) 434 inside the network expander board/switch 430, the need for another server to provide the monitor node for the system may be absent. The processor(s) 434 may further be configured to perform port or switch initialization and/or routing functionalities for communications with the plurality of storage devices 440. For such purposes, the network expander board 430 may include switching hardware 436 and switching firmware 435, for execution by the processor(s) 434. While certain other solutions may include an Ethernet port and switch on a board of a storage device tray, the system 400 may advantageously provide for running OSD code on data storage devices disposed within a tray and/or running of a monitor node on a switch device disposed in or associated with the tray.

Without a separate monitor server, the system 400 may be designed to distribute the work of the monitor server node among the trays and/or network expander boards or switches of the system 400. Such a solution may take advantage of hardware present in the trays and/or network expander boards or switches that may otherwise be under-utilized or substantially idle at least over certain periods of time.

The storage device(s) 440 may each include a controller 442, which may be configured to operate as the OSD. In certain embodiments, the controller 442 comprises an Ethernet bridge device. The one or more processors 443 may be configured to execute the OSD code 441 (e.g., Ceph). The OSD code may provide the object storage daemon for a distributed object storage system (e.g., Ceph). The OSD code may be designed to store objects on a local object storage system and provide access thereto over a network.

The storage device(s) 440 may additionally include data storage media 445, which may comprise one or more of magnetic media, such as one or more magnetic disks, and solid-state media, such as NAND flash, or the like. The controller 442 may be configured to communicate with the data storage media 445 over an interface 449, which be a SATA, SAS or PCIe interface, or other internal, custom interface.

The communication interface 405 between the network expander board 430 and the storage devices 440 may be, for example, a gigabit Ethernet (GbE) interface or 2.5 GbE. The network expander board 430 may branch out to connect with up to 15, or some multiple of 15 or other number, storage devices in certain embodiments. The interface 403 may be configured to transmit data at a higher data rate than the interface 405. For example, the interface 403 may be a 10 GbE interface.

The interface 403 may communicatively couple the network expander board 430 with a top-of-rack switch 450. In certain embodiments, the rack switch 450 includes a processor configured to execute object storage monitor code to act as a monitor node for the system 400. For example, the monitor 451 may monitor storage devices in a plurality of trays disposed within a rack with which the rack switch 450 is associated, among which the tray 420 may be one. In a rack containing multiple trays (e.g., Knox chassis), the various Ethernet connections from each of the trays may go up to the top of the rack to the switch chip 450, which may have a plurality of, for example, 10 GbE ports that the respective network expander boards/switches are plugged into. The system 400 may further include higher-bandwidth ports (e.g., 40/100 GbE ports) that connect across to adjacent racks in the system. In certain embodiments, the rack associated with the rack switch 450 may be designed to house 25-30 trays, or more. Implementation of a monitor in the top-of-rack switch 450 may provide an alternative to implementing the monitor node in the network expander board/switch. In certain embodiments, the system 400 includes a redundant rack monitor in addition to the monitor 451.

The system 400 may further include an interface or mechanism for inter-monitor communication, which may allow for monitor nodes (e.g., implemented in the network expander board 430) to communicate with one another for the purpose of coordinating object storage functionality within the system 400.

By using a processor embedded in the network expander board 430 (e.g., Ethernet switch) to run the operating system 433 (e.g., Linux) and the monitor software 431 (e.g., Ceph), conventional server hardware may not be needed to implement the object storage monitoring functionality within the system. In conjunction with the OSDs 441 running on the storage device(s), the need for additional hardware to run the object storage monitoring code may be substantially eliminated, thereby at least partially reducing the cost, power and/or space requirements of the system 400.

Data Storage Monitoring Processes

Figure 5:
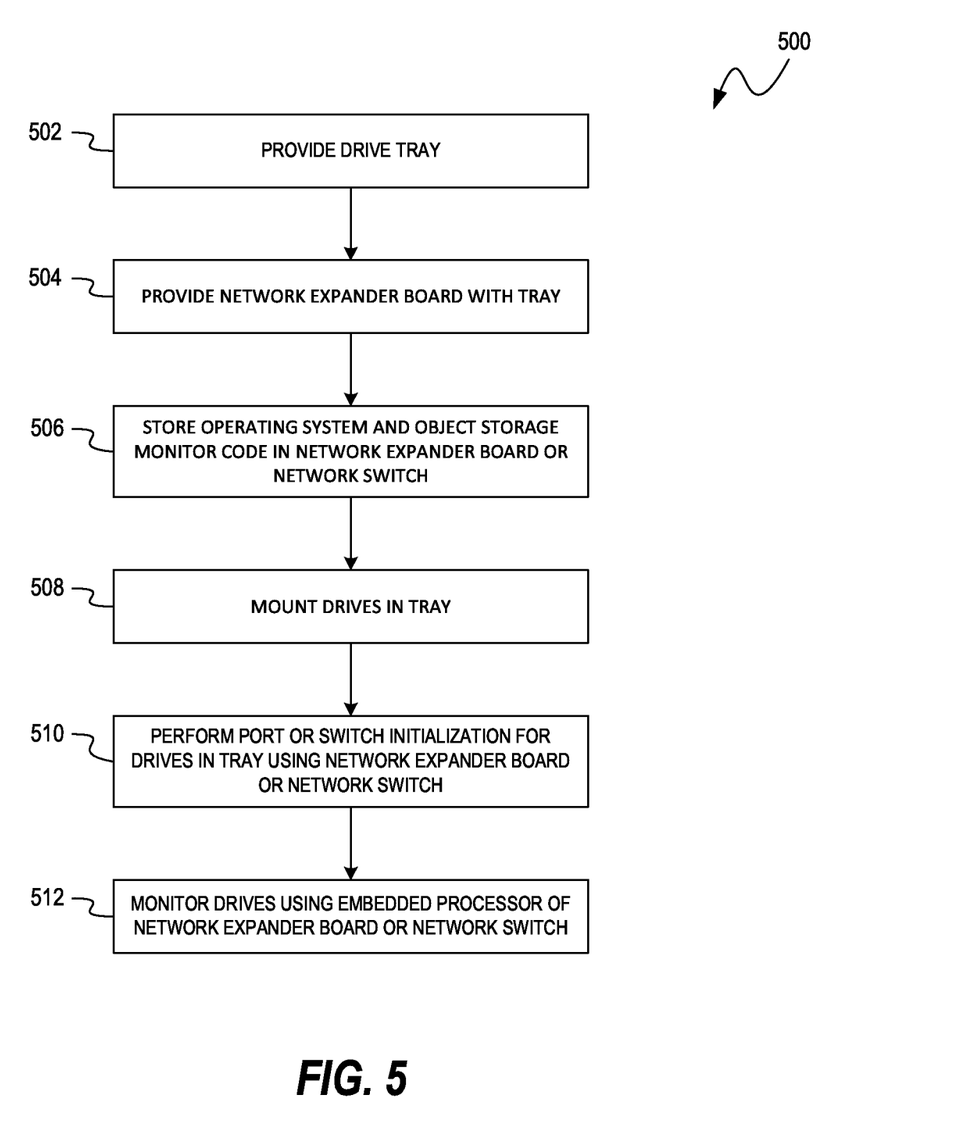
FIG. 5 illustrates a process for monitoring object storage devices according to one or more embodiments.

FIG. 5 illustrates a process 500 for monitoring object storage devices. The process 500 may involve utilization of a distributed object-based data storage system having generic, off-the-shelf hardware. For example, using Open Compute Platform hardware, which may generally be used for SAS based data storage devices, as the basis for Ethernet storage devices, as described in connection with certain embodiments disclosed herein, can at least partially reduce costs and/or allow flexibility to re-deploy rack chassis for Ethernet storage device usage. Certain object storage systems (e.g., Ceph) may require at least one object storage monitor node to oversee the storage pool of OSDs to ensure the proper node maps are in-sync and present. Object storage monitor nodes may include one or more processors, non-volatile and/or volatile memory, operating system code and/or object storage cluster monitoring software. For relatively small pools of OSDs, the processing required for monitoring may be relatively minimal. In view of this limited processing requirement, the process 500 may involve utilization of a relatively simple processor (e.g., a single ARM A9 running Linux) in existing system hardware that is capable of the performance required to implement a monitor node overseeing one or more storage device trays.

At block 502, the process 500 involves providing a drive tray, such as a Knox chassis, as part of an object storage system. For example, the tray may be part of a data center storage system. At block 504, the process 500 involves providing a network expander board, such as an Ethernet switch board, with the tray. In certain embodiments, the network expander board comprises a Broadcom BCM53401xGbE switch device, for example, which may contain an ARM A9 processor. Using the processor(s) of the network expander board, the monitor node for the storage device tray may be implemented on the board (e.g., Ethernet switch) without substantially any additional hardware or physical space required for the monitor node. In addition, using the network expander board on the front of the storage device tray can at least partially limit the monitoring workload to the management of only the number of OSDs associated with the tray, such as 15 OSDs, for example. The limited number of storage devices that may be connected to the tray can serve to keep the monitoring compute requirements substantially within the capability of the processor (e.g., ARM A9 processor) of the network expander board.

At block 506, the process 500 involves storing operating system and object storage monitoring code in a memory associated with, or within, the network expander board, or network switch, so they can be executed at run time by the processor(s) on the board or switch during operation. At block 508, the process 500 involves mounting drives in the tray. Those skilled in art can appreciate the actions taken in blocks 502 to 508 may be performed in different order, as long as the actions are completed to prepare for the object monitoring code to be executed when the OSDs are in use.

According to one embodiment, while blocks 502 to 508 describe preparation and installation of the system, the next few blocks describe the actions taken when the system is powered on and during operation. As such, blocks 502 to 508 may be performed at a separate time than that of blocks 510 to 514. At block 510, the process 500 involves performing port or switch initialization in the tray using the network expander board or network switch. Port and/or switch initialization may involve configuring the switching hardware of the network expander board or network switch for communications between the storage devices of the tray and the network expander board, and further, a top-of-rack switch or other host device or system. In certain embodiments, the initialization of the ports/switches is performed at least in part by an R5 processor or other auxiliary processor embedded in the switch. In certain embodiments, the initialization of the ports/switches is performed at least in part by an A9 processor, or the like (e.g., processor(s) 434 of FIG. 4). For example, a single A9 processor may be utilized to implement both initialization of ports/switches and monitoring, wherein monitoring is performed after initialization is substantially complete.

At block 512, the process 500 involves monitoring the drives/OSDs using one or more embedded processors of the network expander board or network switch. The network expander board or network switch may be a component of the tray, or may be a separate device or module. For example, the network expander board or network switch may be a component of a top-of-rack switch associated with the tray.

While certain object storage solutions may require a separate server for running the OSDs, by using a bridge chip on the storage device that is configured to run the OSD node software, certain embodiments disclosed herein may allow for elimination of at least one server. That is, rather than a server and a plurality of storage devices (e.g., 15), certain embodiments disclosed herein allow for just the plurality of storage devices running independently on the respective data storage devices without the server.

In certain embodiments, a network expander board or network switch operating in connection with a tray need only provide enough processing power for the single tray itself, thereby allowing for division of labor within the object storage system. At block 514, the process 500 involves communicating monitor data between additional monitors for coordination between other monitor nodes of the system. Certain embodiments advantageously comprise an odd number of monitors monitoring a single OSD cluster for the purpose of allowing for conflict resolution, or voting, in the presence of error/discrepancy.

Additional Embodiments

Those skilled in the art will appreciate that in some embodiments, other types of object storage monitoring systems can be implemented while remaining within the scope of the present disclosure. In addition, the actual steps taken in the processes discussed herein may differ from those described or shown in the figures. Depending on the embodiment, certain of the steps described above may be removed, and/or others may be added.

While certain embodiments have been described, these embodiments have been presented by way of example only, and are not intended to limit the scope of protection. Indeed, the novel methods and systems described herein may be embodied in a variety of other forms. Furthermore, various omissions, substitutions and changes in the form of the methods and systems described herein may be made. The accompanying claims and their equivalents are intended to cover such forms or modifications as would fall within the scope and spirit of the protection. For example, the various components illustrated in the figures may be implemented as software and/or firmware on a processor, application-specific integrated circuit (ASIC), system on a chip (SOC), field-programmable gate array (FPGA), or dedicated hardware. Also, the features and attributes of the specific embodiments disclosed above may be combined in different ways to form additional embodiments, all of which fall within the scope of the present disclosure. Although the present disclosure provides certain preferred embodiments and applications, other embodiments that are apparent to those of ordinary skill in the art, including embodiments which do not provide all of the features and advantages set forth herein, are also within the scope of this disclosure. Accordingly, the scope of the present disclosure is intended to be defined only by reference to the appended claims.

All of the processes described above may be embodied in, and fully automated via, software code modules executed by one or more general purpose or special purpose computers or processors. The code modules may be stored on any type of computer-readable medium or other computer storage device or collection of storage devices. Some or all of the methods may alternatively be embodied in specialized computer hardware.

What is claimed is:

1. A storage device tray assembly comprising:
   a plurality of data storage bays configured to receive a plurality of data storage devices; and
   a first interface expander device configured to be communicatively coupled to each of the plurality of data storage devices over a communication interface, the first interface expander device comprising:
   non-volatile memory storing distributed data storage monitor code and operating system code; and
   one or more processors configured to:
   perform port or switch initialization for communications to the plurality of data storage devices;
   execute the operating system code; and
   perform a first portion of a monitor server node workload at least in part by performing distributed data storage monitoring for the plurality of data storage devices using the distributed data storage monitor code;
   wherein:
   said performing distributed data storage monitoring comprises managing data mapping information for data stored across the plurality of data storage devices; and
   the first interface expander device is configured to communicate with a second interface expander device of a separate storage drive tray assembly that performs a second portion of the monitor server node workload.

2. The storage device tray assembly of claim 1, wherein at least one of the one or more processors of the first interface expander device is a reduced instruction set computing (RISC) processor.

3. The storage device tray assembly of claim 1, wherein the plurality of data storage devices are Ethernet storage devices.

4. The storage device tray assembly of claim 1, wherein the plurality of data storage bays consists of 15 bays.

5. The storage device tray assembly of claim 1, wherein the plurality of data storage bays consists of 30 bays.

6. The storage device tray assembly of claim 1, wherein the plurality of data storage devices are Ceph object storage devices.

7. The storage device tray assembly of claim 1, wherein the distributed data storage monitor code, when executed by the one or more processors, is configured to cause the one or more processors to perform one or more of status monitoring and data robustness services for the plurality of data storage devices.

8. The storage device tray assembly of claim 1, wherein the one or more processors are further configured to perform routing functionalities for the plurality of data storage devices.

9. A computing system comprising:
a plurality of data storage device tray assemblies, comprising:
a first tray assembly comprising a first network switching device conforming to a communication interface and configured to use one or more embedded processors of the first network switching device to:
perform port initialization for communications to a first plurality of data storage devices of the first tray assembly; and
perform a first portion of a monitor server node workload at least in part by performing distributed data storage monitoring for the first plurality of data storage devices, said performing distributed data storage monitoring for the first plurality of data storage devices comprising managing data mapping information for data stored across the first plurality of data storage devices; and
a second tray assembly comprising a second network switching device conforming to the communication interface and configured to use one or more embedded processors of the second network switching device to:
perform port initialization for communications to a second plurality of data storage devices of the second tray assembly; and
perform a second portion of the monitor server node workload at least in part by performing distributed data storage monitoring for the second plurality of data storage devices, said performing distributed data storage monitoring for the second plurality of data storage devices comprising managing data mapping information for data stored across the second plurality of data storage devices.

10. The computing system of claim 9, wherein the computing system is configured to provide distributed data storage monitor functionality for the first and second pluralities of data storage devices without a distributed data storage monitor server node separate from the plurality of data storage device tray assemblies.

11. The computing system of claim 9, wherein at least one of the one or more embedded processors of the first network switching device is configured to execute Linux kernel code.

12. The computing system of claim 9, wherein the plurality of data storage device tray assemblies is mounted in a data storage rack assembly.

13. The computing system of claim 9, wherein the first and second network switching devices are configured to perform the first and second portions of the monitor server node workload, respectively, through inter-communication between the first and second network switching devices.

14. A method of monitoring distributed data storage in a computing system comprising a plurality of data storage devices mounted in a plurality of data storage bays of a data storage device tray assembly, the method comprising:
using one or more processors of an interface expander device of the data storage device tray assembly that is communicatively coupled to each of the plurality of data storage devices over a first communication interface to:
perform port or switch initialization for communications to the plurality of data storage devices;
execute distributed data storage monitor code to perform a first portion of a monitor server workload at least in part by monitoring the plurality of data storage devices, said monitoring the plurality of data storage devices comprising managing data mapping information for data stored across the plurality of data storage devices; and
communicate with a separate interface expander device to coordinate performance of a second portion of the monitor server workload by the separate interface expander device.

15. The method of claim 14, wherein at least one of the one or more processors of the interface expander device is a reduced instruction set computing (RISC) processor.

16. The method of claim 14, wherein the distributed data storage monitor code, when executed by the one or more processors of the interface expander device, is configured to cause the one or more processors to perform one or more of data redundancy and data robustness services in the data storage device tray assembly with respect to the plurality of data storage devices.

17. An interface expander device comprising:
non-volatile memory storing distributed data storage monitor code and operating system code; and
a processor configured to:
perform port or switch initialization for communications to a plurality of data storage devices mounted in a storage device tray assembly associated with the interface expander device; and
execute the operating system code and the distributed data storage monitor code to:
perform a first portion of a monitor server node workload at least in part by performing distributed data storage monitor functionality for the plurality of data storage devices, said performing distributed data storage monitor functionality for the plurality of data storage devices comprising managing data mapping information for data stored across the plurality of data storage devices;
wherein:
the interface expander device is communicatively coupled to each of the data storage devices over a first communication interface; and
the interface expander device is configured to be communicatively coupled to a separate interface expander device configured to perform a second portion of the monitor server node workload.

18. The interface expander device of claim 17, wherein the interface expander device is a network switching device.

* * * * *